United States Patent
Trüggelmann

(10) Patent No.: US 6,835,075 B2
(45) Date of Patent: Dec. 28, 2004

(54) PROFILE MEMBER WITH CURRENT RAIL

(75) Inventor: Kai Trüggelmann, Bielefeld (DE)

(73) Assignee: Mobelwerk A. Truggelmann GmbH & Co. KG, Bielefeld (DE)

( * ) Notice: Subject to any disclaimer, the term of this patent is extended or adjusted under 35 U.S.C. 154(b) by 106 days.

(21) Appl. No.: 10/312,385

(22) PCT Filed: Apr. 12, 2002

(86) PCT No.: PCT/EP02/04116

§ 371 (c)(1), (2), (4) Date: Dec. 24, 2002

(87) PCT Pub. No.: WO02/097932

PCT Pub. Date: Dec. 5, 2002

(65) Prior Publication Data

US 2003/0176088 A1 Sep. 18, 2003

(30) Foreign Application Priority Data

May 25, 2001 (DE) .................... 201 08 792 U

(51) Int. Cl.$^7$ .............................. H01R 25/00
(52) U.S. Cl. ........................ 439/110; 174/96
(58) Field of Search ................ 439/110, 111, 439/120, 121, 122, 116; 174/118, 96, 99, 68.1

(56) References Cited

U.S. PATENT DOCUMENTS

| | | | |
|---|---|---|---|
| 3,894,170 A | * | 7/1975 | Schnizel ................ 174/99 |
| 4,776,809 A | | 10/1988 | Hall |
| 4,881,907 A | | 11/1989 | Bergman et al. |
| 5,348,485 A | | 9/1994 | Briechle et al. |
| 6,274,817 B1 | * | 8/2001 | Jaakkola et al. ........ 174/96 |

FOREIGN PATENT DOCUMENTS

| | | |
|---|---|---|
| AT | 314009 | 3/1974 |
| DE | 7315749 | 4/1978 |
| DE | 2915502 | 10/1980 |
| DE | 8124709 | 3/1983 |
| DE | 4006004 | 8/1992 |
| DE | 9210728 | 12/1992 |
| DE | 4042394 | 7/1993 |
| DE | 9309403 | 9/1993 |
| DE | 4210445 | 10/1993 |
| DE | 9312536 | 2/1994 |
| DE | 9409435 | 9/1994 |
| DE | 4312671 | 1/1995 |
| DE | 4412767 | 10/1995 |

* cited by examiner

Primary Examiner—Alex Gilman
(74) Attorney, Agent, or Firm—Richard M. Goldberg

(57) ABSTRACT

Profile member including a current rail, characterized in that the profile member (10) forms two profile openings (12) having internal cross-sections with identical shapes, into which a current rail profile (14) is detachably insertable.

19 Claims, 2 Drawing Sheets

PROFILE MEMBER WITH CURRENT RAIL

BACKGROUND OF THE INVENTION

The invention relates to a profile member including a current rail.

Current rails are widely used in electrical installations and have the advantage that the electrical energy can be fed-in by means of a feeder in an arbitrary position and can be tapped by means of adapters, to which electrical loads are connectable, also at arbritary positions. It is also known to integrate such current rails into profile members which at the same time have a supporting function in racks, furniture components and the like.

SUMMARY OF THE INVENTION

It is an object of the invention to provide a profile member including a current rail and having a variaty of utilities.

According to the invention, this object is achieved by the feature that the profile member has two profile openings having internal cross-sections with identical shapes, into which a current rail profile is detachably insertable.

In this profile member, one and the same current rail profile may be inserted into either of the two profile openings as desired by the user, so that the feeders and/or adapters can be arranged not only in arbitrary longitudinal positions but also on two different sides of the cross-section of the profile member. Thus, an optimal arrangement of the adapters in accordance with the intended use is made possible. Of course, it is also possible to insert two identical current rail profiles in both profile openings, thereby to form a duplex current rail.

The invention therefore relates also to a profile member which is characterized in that two parallel current rails are integrated in the same profile member.

Useful embodiments of the invention are indicated in the dependent claims.

In the last-mentioned embodiment, the electrical conductors of the two current rails may belong to different circuits. This offers the possibility, for example in illumination installations, to switch or dim the lamps, that are connected to the different current rails, group-wise.

In a generalisation of the inventive concept it is also possible that the profile member forms more than two profile openings for current rail profiles and/or accommodates more than two parallel current rails.

The different current rails may also be supplied with different voltages. Thus, it is possible for example to use one current rail as a line-current rail for supplying electrical equipment such as hi-fi systems, TV sets and the like with the line voltage of 230V, whereas the other current rail is used as a low-voltage current rail for halogen lamps that are energized with a DC voltage of 12 or 24 V. Preferably, the two or more current rails have nevertheless an identical construction, satisfying the requirements for a line-current rail in terms of insulation, touch pevention and presence of a ground wire, while on the other hand the cross-sections of the conductors are adapted to the generally larger current intensities for low-voltage equipments.

The two profile openings and the two current rails, respectively, may be arranged in the profile member such that they are accessible from the same side or from opposite sides. In a preferred embodiment, the profile member, as a whole, has an approximately elliptic cross-section, and the two profile openings are arranged diametrically opposite to one another on the large axis of the ellipse. The profile member may for example be formed by an extruded profile of aluminum or an aluminum alloy and is preferably provided, in addition to the profile openings for the current rails, with one or more installation grooves, arranged for example diametrically opposite to one another on the small axis of the ellipse, for fastening rack shelves or other furniture components. Thus, the profile member may for example be used as an upright for racks or as a supporting upright for cupboards, and the electrical power for lamps and other loads can be tapped on the front side or on the back side of the upright depending upon the demand.

When one of the current rails, that are designed for line voltage, is used for a low-voltage system, the ground wire may be utilized for forming, per current rail, two electric circuits which can be switched separately. In low-voltage appliances, an additional circuit may also be formed by utilizing the metal profile member itself as an electrical conductor.

The current rail profiles that are detachably inserted in the profile member are preferably formed by extruded profiles of plastic which can be snap-fastened in the profile openings of the profile member and in which the electrical conductors are embedded such that they are insulated from the profile member.

Seats for a thrust-in or snap-in cover profile may be formed at the edge of the profile openings. The profile opening that is not used for accommodating a current rail profile may be blindfolded by means of the cover profile. Likewise it is possible that the current rail profile, which is preferably provided in the form of an endless material, is inserted only in certain longitudinal portions of the profile member. The remaining longitudinal portions may then be covered with the cover profile. Optionally, the cover profile may also be provided over the current rail profile, so that parts of the current rail profile which serve only for electrically connecting adjacent parts, that are accessible for adapters, are blindfolded by means of the cover profiles.

BRIEF DESCRIPTION OF THE DRAWINGS

Embodiments of the invention will now be explained in detail in conjunction with the drawings, in which.

DETAILED DESCRIPTION

Figure 1:
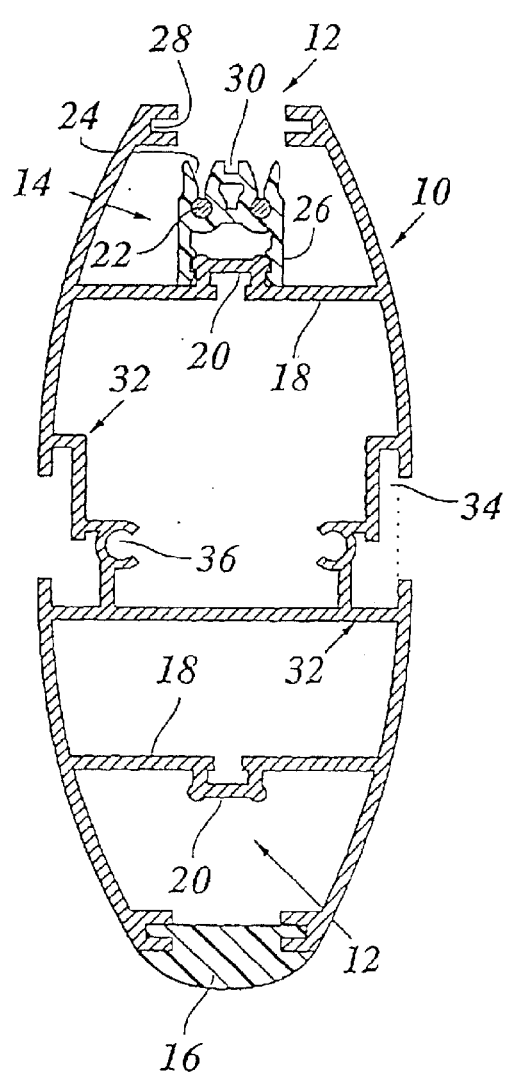
FIG. 1 is a cross-section of a profile member according to the invention.
Figure 2:
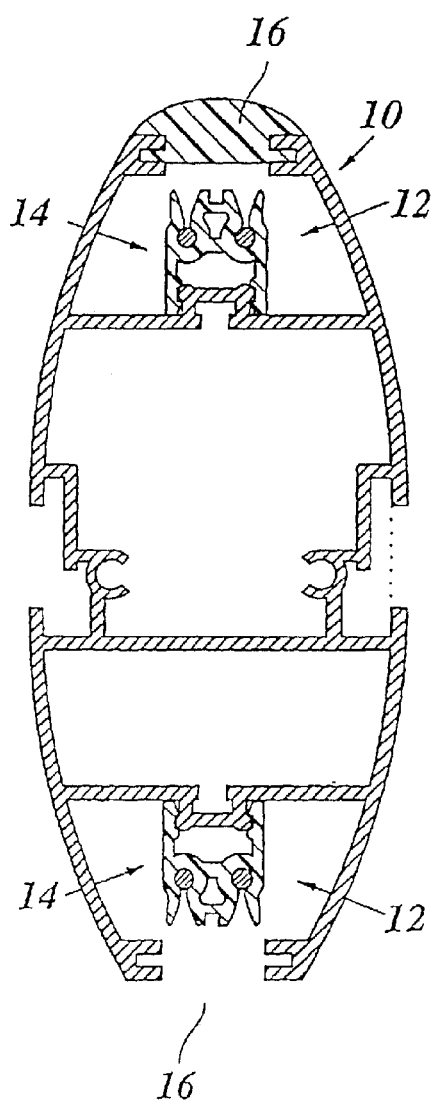
FIG. 2 is a section through the profile member according to FIG. 1 in another configuration.

The profile member 10 which has been shown in cross-section in FIG. 1 is formed by an extruded profile, for example of aluminum, and has an approximately elliptical external cross-sectional shape. Two profile openings 12 having identical shapes, in which an electrically insulating current rail profile 14 may be snap-fastened, are formed mirror-symmetrically and diametrically opposed to one another on the large axis of the ellipse. In the condition shown in FIG. 1, a current rail profile 14 has been inserted only in the top profile opening 12, whereas the bottom profile opening is closed by a cover profile 16. In contrast, FIG. 2 shows a configuration in which current rail profiles 14 are inserted in both profile openings 12. Here, the sectional plane is situated in a longitudinal portion of he profile member 10 in which the lower current rail profile 14 is accessible through the profile opening, which is not closed there, whereas the top current rail profile 14 is hidden behind the cover profile 16.

The base of each profile opening 12 is defined by a web 18 of the profile member, which web forms a snap contour 20 projecting convexly into the profile opening 12.

The current rail profile 14 is formed as an extruded plastic profile, as is known per-se, in which two conductors 22 are embedded such that they are electrically insulated from one another and are each accessible through a slot 24. The current rail profile 14 is snap-fastened on the snap contour 20 with two lock ribs 26 such that the slots 24 are directed towards the open side of the profile opening 12.

The walls of the profile member 10 delimiting the profile opening 12 are formed with two diametrically opposite grooves 28 which serve for fastening the cover profile 16. At the same time, the grooves 28 may serve for fastening an adapter, which has not been shown, and which has contact blades engaging into the slots 24 of the current rail profile 14 for tapping the electrical current from the conductors 22. Adapters which are to be fastened to a current rail in this way are known per-se and are therefore not described in detail herein. The profile member 10 and the current rail profile 14 are preferably designed to be compatible with commercially available adapters.

In the shown example the current rail profile 14 has only two conductors 22 for use as a low-voltage current rail. However, in terms of insulation and touch prevention, the current rail profile 14 and its arrangement in the profile member 10 fulfills also the requirements for a line-current rail for a voltage of 230 V for example. In this case, a ground wire may be fitted in a groove 30 of the current rail profile, or the profile member 10 as a whole may be used as ground conductor.

Figure 3:
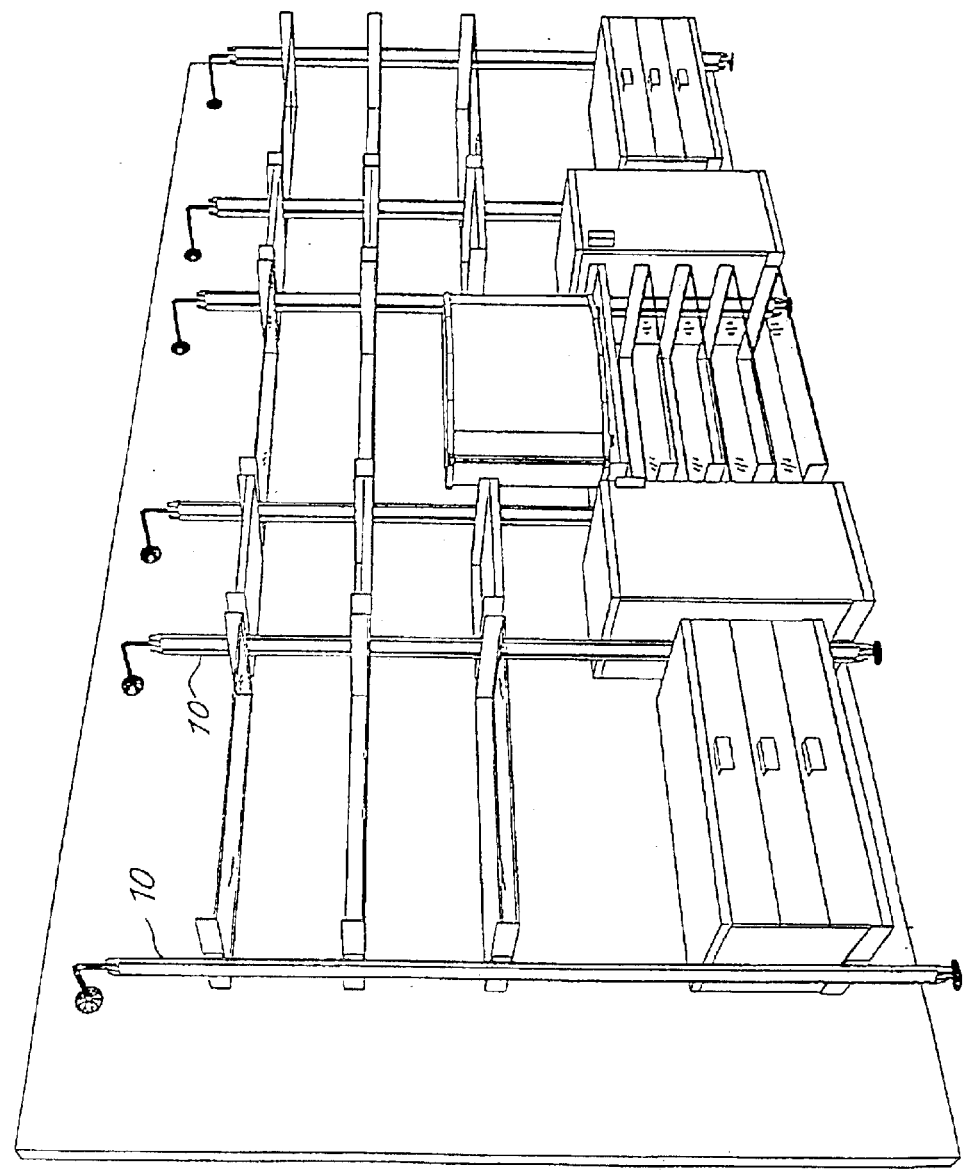
FIG. 3 is a perspective view of a rack-type wall unit in which the profile members of the type shown in FIGS. 1 and 2 are used as rack uprights.

On the small axis of the elliptical cross section of the profile member 10, there are formed diametrically opposite fastening profiles 32 the cross-sections of which are mirror-symmetric to one another relative to the central axis of the profile member 10, and each fastening profile forms an undercut fastening groove 34 for rack shelves or other functional components as well as a bolt channel 36. The profile members 10 having the fastening grooves 34 may therefore be used as uprights for a rack-type wall unit, as is known in the art and as has been shown in FIG. 3. The rack shelves or other furniture components may be fixed in the fastening grooves 34 in a known manner by means of clamp fittings or screws. The bolt channels 36 serve for example for fixing end caps on both ends of the profile members 10.

What is claimed is:

1. Profile member including a current rail, comprising:
    a main body including two profile openings having internal cross-sections with identical shapes,
    at least one current rail profile detachably insertable to at least one internal cross-section,
    at least one of:
        the profile openings and
        the corresponding rail profiles are arranged diametrically opposite to one another in the profile member and are directed outwards, and
    the profile member is formed as an upright of a rack and includes fastening arrangements for rack components, said fastening arrangements being arranged diametrically opposite to one another at right angles to the profile openings for the current rail profiles.

2. Profile member according to claim 1, wherein the profile member forms, at edges of the profile openings, engaging contours for one of:
    a current rail adapter and
    a cover profile.

3. Profile member according to claim 1, wherein the current rail profile is an extruded profile of synthetic resin, in which at least two conductors are adapted to be embedded and which are accessible via slots of the current rail profile.

4. Profile member according to claim 3, wherein the slots are directed towards an open side of the profile openings of the profile member.

5. Profile member according to claim 1, wherein the at least one current rail profile is adapted to be snap-fastened in at least one opening.

6. Profile member according to claim 5, wherein the profile member is a hollow profile which is internally provided with two webs, each of which defines a base of one of the profile openings and forms a snap contour for detachably holding one current rail profile.

7. Profile member according to claim 5, wherein the current rail profile is an extruded profile of synthetic resin, in which at least two conductors are adapted to be embedded and which are accessible via slots of the current rail profile.

8. Profile member according to claim 5, wherein the profile member forms, at edges of the profile openings, engaging contours for one of:
    a current rail adapter and
    a cover profile.

9. Profile member according to claim 1, wherein two current rail profiles are arranged in parallel to one another and are integrated in a common profile member.

10. Profile member according to claim 9, wherein the at least one current rail profile is adapted to be snap-fastened in at least one opening.

11. Profile member according to claim 9, wherein the current rail profile is an extruded profile of synthetic resin, in which at least two conductors are adapted to be embedded and which are accessible via slots of the current rail profile.

12. Profile member according to claim 9, wherein the profile member forms, at edges of the profile openings, engaging contours for one of:
    a current rail adapter and
    a cover profile.

13. Profile member according to claim 9, wherein the current rail profiles have identical cross-sections.

14. Profile member according to claim 13, wherein the at least one current rail profile is adapted to be snap-fastened in at least one opening.

15. Profile member according to claim 13, wherein the current rail profile is an extruded profile of synthetic resin, in which at least two conductors are adapted be embedded and which are accessible via slots of the current rail profile.

16. Profile member according to claim 13, wherein the profile member forms, at edges of the profile openings, engaging contours for one of:
    a current rail adapter and
    a cover profile.

17. Profile member including a current rail, comprising:
a main body including two profile openings having internal cross-sections with identical shapes, and
two current rail profiles arranged in parallel to one another and integral with the two internal cross-sections of the main body,
at least one of:
   the profile openings and
   the corresponding rail profiles are arranged diametrically opposite to one another in the profile member and are directed outwards, and
the profile member is an upright of a rack and includes fastening arrangements for rack components, said fastening arrangements being arranged diametrically opposite to one another at right angles to the profile openings for the current rail profiles.

18. Profile member according to claim 1, wherein the two openings are open to an outside of said profile member.

19. Profile member according to claim 17, wherein the two openings are open to an outside of said profile member.

* * * * *